April 3, 1928.                F. H. HEADLEY                1,664,858
SCOOTER
Filed Jan. 19. 1924
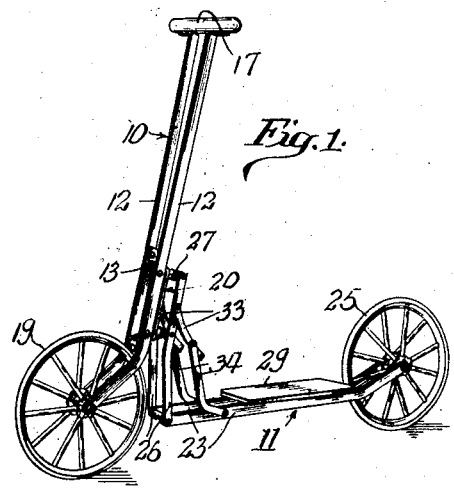
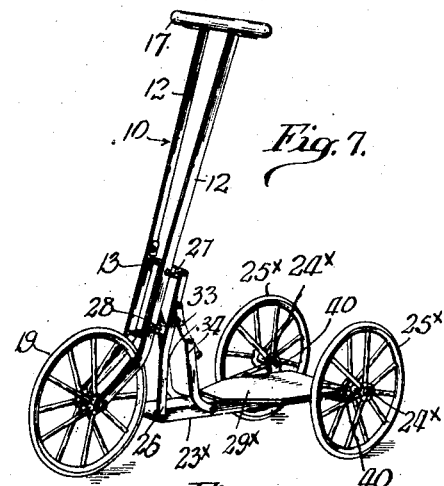
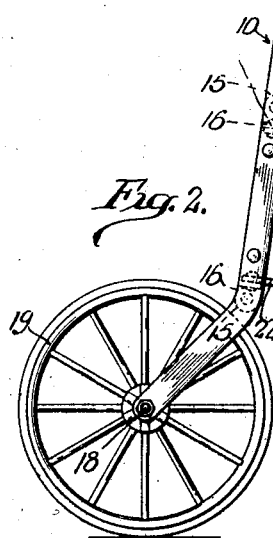
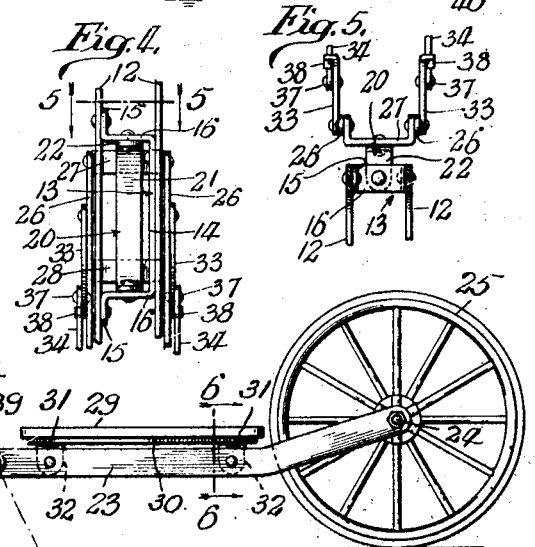
Inventor
Frederick H. Headley Patented Apr. 3, 1928.

1,664,858

UNITED STATES PATENT OFFICE.

FREDERICK H. HEADLEY, OF NORTHFIELD, NEAR BIRMINGHAM, ENGLAND.

SCOOTER.

Application filed January 19, 1924. Serial No. 687,182.

This invention relates to improvements in scooters which are propelled vehicles especially designed for use by children, said vehicles usually comprising a wheeled steering post and a wheeled platform upon which the child stands with one foot while he propels himself along with the other foot in the manner well known, and the invention consists of the matters hereinafter described and more particularly pointed out in the appended claims.

The primary object of the invention is to so construct such a vehicle, that it may be folded into a comparatively small package or bundle so that it may be easily stored out of the way or may be readily packed in boxes for shipment.

A further object of the invention is to improve in general the construction of such a vehicle so that substantially its entire frame work may be made from metallic straps or bands of steel, thus eliminating the necessity of castings and materially reducing the cost of production thereof.

The many advantages of the invention will more fully appear as I proceed with my specification.

In the drawings:—

Fig. 1 is a perspective view of a scooter embodying my invention, as it appears when "set up" or in the condition ready for use.

Fig. 2 is a view in side elevation on an enlarged scale of my improved scooter.

Fig. 3 is a view similar to Fig. 2 showing the scooter folded or collapsed for storage or shipment.

Fig. 4 is a detail view in front elevation of that part of the steering post and associated parts located just above the front wheel.

Fig. 5 is a detail horizontal sectional view as taken on the line 5—5 of Fig. 4.

Fig. 6 is a detail cross sectional view through the platform and associated frame members, the plane of the section being indicated by the line 6—6 of Fig. 2.

Fig. 7 is a perspective view of the improved scooter in a slightly modified form.

Referring now in detail to that embodiment of the invention illustrated in Figs. 1 to 6 inclusive of the accompanying drawings: 10 indicates the steering post as a whole and 11 the platform supporting frame, which post and frame are operatively connected together by a suitable link arrangement that permits the steering post to be folded down from its operative position into an inoperative position above said platform frame as will later appear.

The steering post 10 in this instance comprises two metallic strap members or arms 12—12 which are held in a spaced apart relation by a spacing yoke 13 (see Fig. 4) located nearer the bottom ends of said arms than the top ends thereof. This yoke includes an elongated intermediate or body part 14 which is riveted to the inside of one of the arms 12, and two end parts 15—15 which are riveted to the inside of the other arm 12, said intermediate body part and the two end parts being connected together by top and bottom transverse cross bars 16—16. The top ends of the arms 12—12 are bent laterally outward and to said ends a transverse handle bar 17 is secured in any suitable manner. The bottom ends of the arms 12 below the yoke 13 are inclined forwardly to provide a fork to receive the ends of an axle 18 upon which is journalled the front wheel 19 of the vehicle. Preferably said wheel is of the wire spoke kind and has a rubber tire.

20 indicates a steering head bracket or yoke having an elongated body 21 and forwardly extending top and bottom bent-over ears 22 which engage between and are pivotally connected by rivets as shown to the cross bars 16 of the yoke 13 before referred to. The body 21 of the bracket is arranged in back of the steering post and as is apparent, a limited relative pivotal movement is provided between said steering post and head.

The platform supporting frame 11 comprises two horizontally extending, spaced, edgewise arranged flat bars 23—23, the rear ends of which are bent slightly upwardly. In said rear ends is secured the ends of an axle 24 upon which a wheel 25 is journalled, said wheel being similar to the wheel 19 before described. To the forward ends of said frame members 23 are pivotally connected the bottom ends of a pair of links 26. The top ends of the links 26 are secured to the laterally extending ears of a transversely extending U-shaped clip 27 which is riveted to the rear face of the body 21 of the steering head bracket 20 near its top end. 28 indicates a similar U-shaped clip which is secured to the bottom end of the steering head bracket in a similar manner and the laterally extending ears of said last named clip are attached by rivets to the links 26 between their ends. As shown in Fig. 2 the top parts of the links 26, extend in a plane parallel with the steering post, while the bottom ends of said links are inclined rearwardly from said plane.

29 indicates the platform of the vehicle which is secured to the frame bars 23 in advance of the rear wheel 25. Said platform is preferably a rectangular elongated board which is secured to a base 30 which in turn is riveted to two longitudinally spaced clips 31—31. Said clips include downwardly facing ears 32 which engage the inner surfaces of the frame bars 23 and are riveted or otherwise secured to said frame bars. This construction provides a strong and rigid platform which readily withstands the strains imposed upon it under the weight of the child using the vehicle and holds the frame bars in proper spaced relation and against spreading apart.

Associated with the links 26 before mentioned for supporting the front end of the platform frame from the steering post is a pair of folding brace bars which include top and bottom links 33 and 34 respectively. The bottom ends of the bottom links 34 are bent or curved rearwardly and embrace and are pivotally attached to the frame bars 23 just forward of the platform 29 by rivets or bolts 35. The top ends of the top links 33 embrace the top ends of the links 26 before referred to and are pivoted thereto at a point about midway between the U-clips 27—28 by means of rivets or bolts 36. The top ends of the links 34 embrace the bottom ends of the links 33 and are pivotally connected thereto a short distance from the extreme bottom ends of the links 33 by rivets 37. The said extreme bottom ends of the top links are bent laterally to provide outwardly extending ears 38 which when the brace links are in their wide open extended position, engages the links 34 a short distance below their top ends. When the parts are in the position wherein the vehicle is ready for use, the pivotal axis between the links 33 and 34 provided by the rivets 37 are located in a plane spaced forwardly of a plane intersecting or passing through the axes provided by the rivets 35 and 36, as shown in Fig. 2, wherein the last mentioned plane is indicated by the dotted line 39. By the construction just described, which of course includes the ears 38, a locking rule or prop joint is provided in the brace bars. Such weight as is imposed upon the platform 29 acts to make this joint more rigid and eliminates any accidental folding of the links as would be apt to occur if the axis 37 were to the rear instead of to the front of the plane indicated by said dotted line 39. Thus the links act to a better advantage for their intended purpose when a weight or load is imposed upon the platform.

When it is desired to collapse or fold up the vehicle so that it may be stored in an out of the way place or so that it may be readily packed in a comparatively small package or box for shipment, the rule or prop joint provided at the connected ends of the links 33 and 34 is broken by grasping said links at said joint so as to move the axis provided by the rivets 37 into a plane to the rear of that indicated by the dotted line 39. When this has been done, the steering post 10 and links 26 swing rearwardly and downwardly toward the platform 29, the links 33 swinging upwardly so as to extend substantially parallel with top ends of the links 26 and the top ends of the links 34 will swing rearward over upon the platform; the top ends of the steering post arms embracing or straddling the top part of the rear wheel, all as shown in Fig. 3. By forming or bending the links 26 and 34 as before described, they fold into a more compact arrangement without interference from the platform. To "set up" the vehicle into its operative form, it is only necessary to swing the post 10 upwardly about its pivotal connection with the forward ends of the frame members 23; the links 33 and 34 tending to straighten out in this movement of the steering post. The pivotal connections 35, 36 and 37 of the links 33 and 34 will at this time, all be arranged in substantially the same plane, after which a downward and inward pressure is applied to the links 33 and 34 adjacent the rivets 37 so that said rivets are swung forward of the plane indicated by the dotted line 39 when at the same time the ears 38 of the top links will engage the links 34 and prevent further movement in this direction, and effectively locking the joint between said ends. It is apparent that the connection between the links 33—34 provides a joint similar to that found in a folding rule only said joint in this instance is a breakable lock joint which increases its locking characteristics when a weight is imposed upon the platform. Thus the danger of the device folding up when in actual use is entirely eliminated so that the device is indeed safe for use by children.

Some children soon become apt in acquiring the knack of balancing, necessary when using two wheel scooters, but this knack is not readily acquired in children of more tender years. To make the scooter suitable for use by such children of tender years so that they may enjoy the pleasure and healthful recreation gained in the use of a vehicle of the kind, I may construct the scooter with three wheels instead of two wheels as before described, a three wheeled scooter standing upright without any support.

In Fig. 7 I have shown a three wheeled scooter embodying my invention. In said figure 29ˣ indicates the platform and 23ˣ the frame bars upon which it is mounted, and secured to the underside of the platform at the rear end thereof are laterally extending clips 40, each of which carries an axle 24ˣ upon each of which is journalled a wheel 25ˣ. When the parts are in their folded position, the steering post 10, extends in a position between said wheels as is apparent. As all of the other parts are the same as before described, I have indicated them by the same reference numerals as employed in connection with Figs. 1 to 6 inclusive.

While in describing my invention I have referred to certain details of mechanical construction and arrangement of parts, I do not wish to be limited thereto except as may be pointed out in the appended claims.

I claim as my invention:

1. In a vehicle of the kind described, the combination of a normally substantially upright steering post, a horizontally disposed platform frame, wheels carried by said post and frame respectively, a steering head pivotally connected to the steering post for a lateral movement, a pair of clips fixed to the head and including spaced ears, a pair of links pivotally connected at their bottom ends to the front end of the frame and rigidly fixed at their top ends to the spaced ears of said clips carried by the steering head, and folding brace bars including a breakable lock rule joint, with the top ends thereof connected to said links between said clips and with the bottom ends thereof connected to the platform frame, said brace bars being capable of being locked in their extended position to hold the post and frame in their operative relation or being folded, one upon the other, so that the post may be swung back and over upon the frame.

2. A steering post for a vehicle of the kind described comprising a pair of flat spaced bars, a yoke including a body and a pair of spaced ears connected together by transverse members, with the body secured to one of the spaced bars and with the ears secured to the other of said bars, a steering head including a body and spaced ears, with the ears pivotally connected to the transverse members of the yoke and with the body arranged to the rear of said steering post, clips secured to the body of the steering head and including rearwardly extending ears, a handle connecting the top ends of the spaced bars of the post together, an axle connecting the bottom ends of said bars together, and a wheel journalled on said axle.

In testimony whereof, I have hereunto set my hand, this 1st day of November, 1923.

FREDERICK H. HEADLEY.